United States Patent [19]

Decker et al.

[11] Patent Number: 4,533,962
[45] Date of Patent: Aug. 6, 1985

[54] VEHICLE PERFORMANCE DETECTION AND RECORDING APPARATUS

[76] Inventors: Ronald R. Decker, 5548 S. Telluride St., Aurora, Colo. 80015; William T. Shannon, 1812 Canyon Blvd., Boulder, Colo. 80301

[21] Appl. No.: 405,591

[22] Filed: Aug. 5, 1982

[51] Int. Cl.³ .................................................. G11B 5/00
[52] U.S. Cl. ............................................ 360/5; 360/6
[58] Field of Search ............................ 360/5, 6, 7, 12; 369/21, 69; 340/669, 670, 671

[56] References Cited

U.S. PATENT DOCUMENTS

| | | |
|---|---|---|
| 886,788 | 5/1908 | Foote . |
| 1,252,102 | 1/1918 | Erdle . |
| 1,484,125 | 2/1924 | Frazer . |
| 1,701,582 | 2/1929 | Mengden . |
| 1,827,988 | 10/1931 | Kourtzman . |
| 1,910,191 | 5/1933 | Tisdale . |
| 2,487,819 | 11/1949 | Markley et al. ........................ 346/53 |
| 2,906,581 | 9/1959 | Huden ..................................... 346/8 |
| 2,916,202 | 12/1959 | Beishline ............................... 235/58 |
| 2,959,459 | 11/1960 | Ryan ...................................... 346/7 |
| 2,976,102 | 3/1961 | Palmer ................................... 346/18 |
| 2,992,296 | 7/1961 | Albrecht ................................. 360/5 |
| 3,075,192 | 1/1963 | Ryan et al. ............................. 346/23 |
| 3,099,817 | 7/1963 | Kendall ............................ 340/172.5 |
| 3,132,916 | 5/1964 | Müller ................................... 346/62 |
| 3,160,463 | 12/1964 | Moscarini ............................. 346/33 |
| 3,206,116 | 9/1965 | Short ..................................... 235/91 |
| 3,213,459 | 10/1965 | Bramsch et al. ..................... 346/18 |
| 3,333,247 | 7/1967 | Hadley et al. ......................... 360/6 |
| 3,383,696 | 5/1968 | Fichter ................................... 346/7 |
| 3,624,660 | 11/1971 | Fichter ................................. 346/49 |
| 3,706,097 | 12/1972 | Bauer ................................... 346/18 |
| 3,792,445 | 2/1974 | Bucks et al. ........................... 360/6 |
| 3,801,963 | 4/1974 | Chen ..................................... 360/5 |
| 3,855,599 | 12/1974 | Helmschrott et al. .............. 346/62 |
| 3,983,565 | 9/1976 | Koller .................................. 346/18 |
| 4,067,061 | 1/1978 | Juhasz ................................ 364/900 |
| 4,084,151 | 4/1978 | Penner ................................... 360/6 |
| 4,184,166 | 1/1980 | Olson ................................... 346/49 |
| 4,188,618 | 2/1980 | Weisbart ........................... 340/201 |
| 4,212,016 | 7/1980 | Ruhl .................................... 346/62 |
| 4,408,309 | 10/1983 | Kiesling et al. ........................ 360/7 |
| 4,409,670 | 10/1983 | Herndon et al. ...................... 360/5 |
| 4,426,691 | 1/1984 | Kawasaki ............................ 360/12 |

Primary Examiner—Vincent P. Canney
Attorney, Agent, or Firm—John E. Reilly

[57] ABSTRACT

A method and apparatus for sensing and recording diverse operational and performance characteristics of automotive vehicles and the like has a plurality of transducers directly associated with different mechanical functions of the vehicle for sensing their operating characteristics in relation to time as well as generating analog signals representative of certain functions and combining them with digital signals representing other functions. A signal converter encodes signals from the transducers and converts the signals in predetermined order into digital data signals. Each succession of signals generated are temporarily stored. A recorder then records information stored serially and enables ready access to and identification of each event or condition. After recordation of information over a selected time interval, the recording is automatically erased as additional information is transmitted to the recorder to provide a current history over limited time intervals, such as, 30 minutes so as to be especially useful in accident analysis.

15 Claims, 7 Drawing Figures

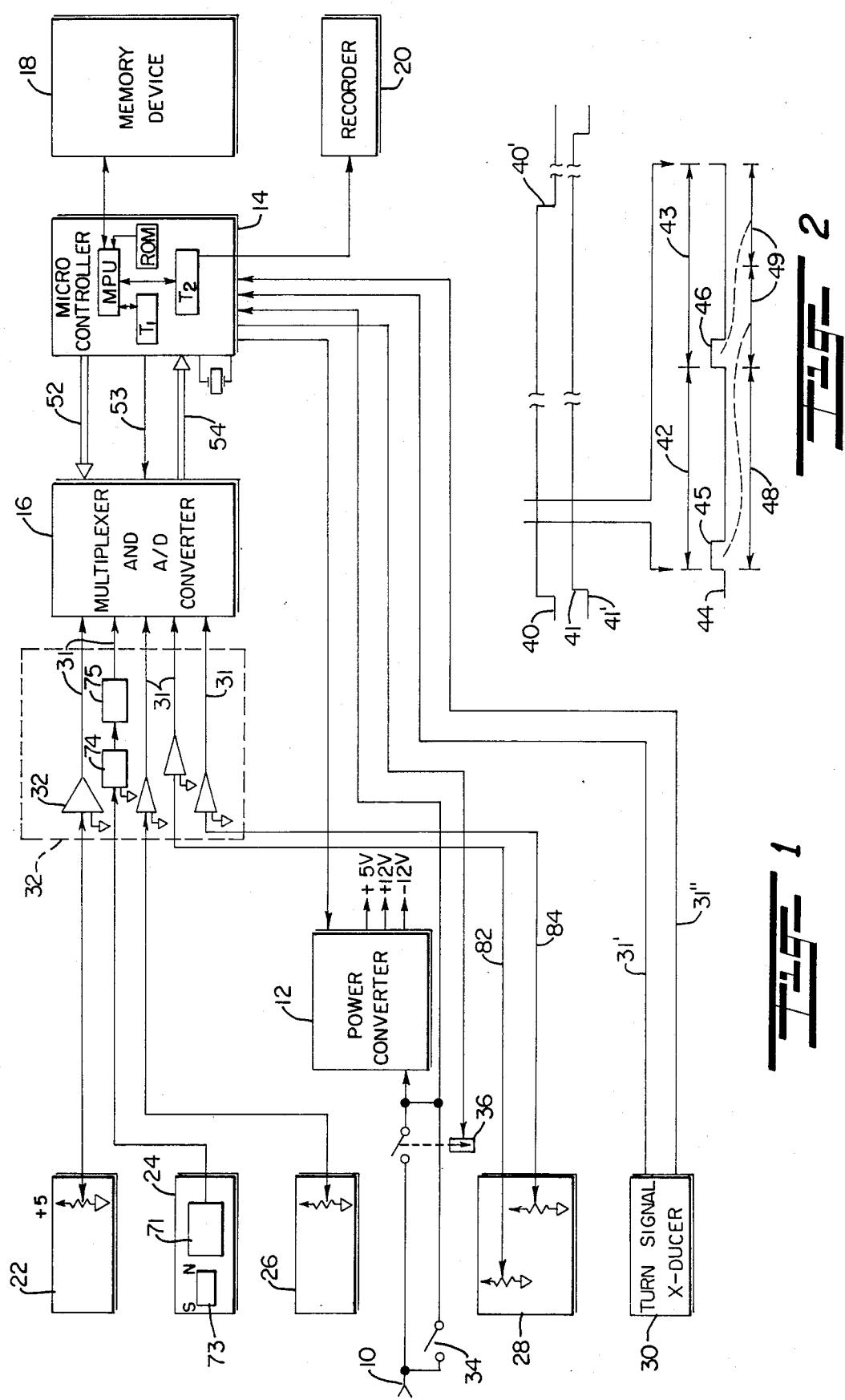

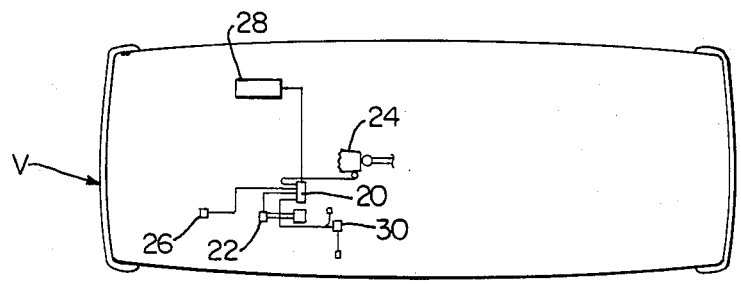
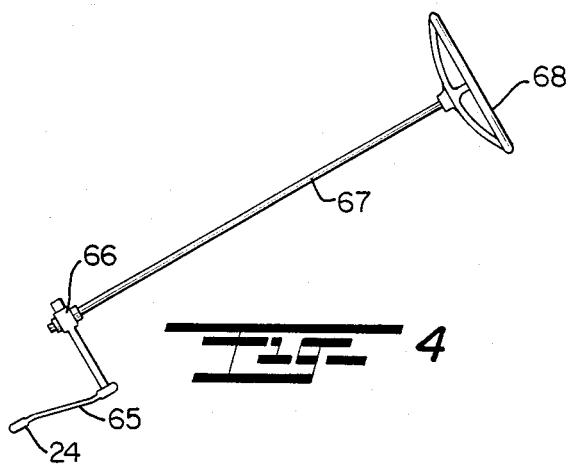
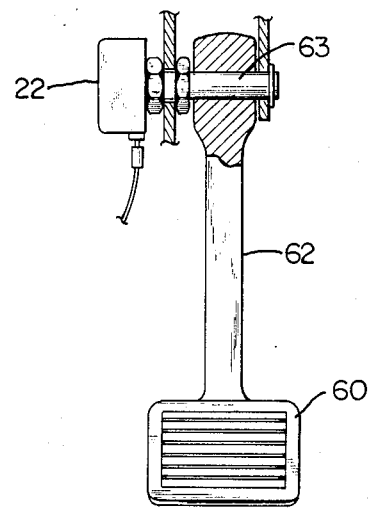
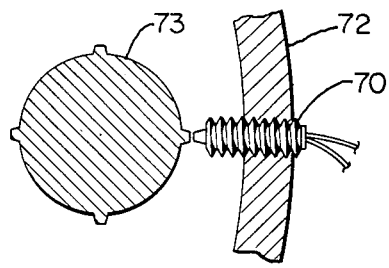
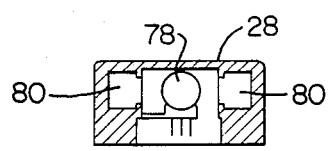

VEHICLE PERFORMANCE DETECTION AND RECORDING APPARATUS

This invention relates to the detection and recording of vehicle performance; and more particularly relates to a novel and improved method and apparatus for sensing and recording continuously and over predetermined intervals various characteristics of the performance and operation of a motor vehicle so as to be particularly useful in accident analysis.

BACKGROUND AND FIELD OF INVENTION

Various techniques have been devised in the past for analyzing the cause of automobile accidents. In many situations, eyewitness accounts are lacking; or, if available, are subject to considerable speculation and fail to provide an accurate picture of speed, acceleration of the vehicle or vehicles involved, braking, change in direction or use of turn signals. Accident modeling is perhaps the most common means of recreating an accident and which, with the aid of expert testimony, can be successfully employed in determining the possible cause of an accident. In accident modeling, however, much has to be deduced from the extent of damage caused by the impact and, particularly in the absence of eyewitness accounts of the accident, does not afford a complete picture of the dominant or major cause of the accident; nor is it always possible to deduce from the extent and nature of damage all of the factors which may have contributed to the accident. This is especially true with respect to the performance of each vehicle involved over a preselected time interval prior to and during the accident. For instance, although vehicle or accident modeling may reveal the total force of impact between two vehicles, such is not always an accurate gauge of the speed of each car prior to the accident, or whether one vehicle or the other was accelerating or decelerating immediately prior to the accident. The same is true of braking, steering or turning, or whether one or both cars employed turn signals or headlights.

Systems have been devised in the past for recording certain of the above and other performance characteristics of vehicles. For example, speed and distance recorders are in widespread use for ground vehicles, aircraft as well as ships. Representative patents disclosing such systems are U.S. Pat. Nos. 1,252,102 to R. Erdle; 1,827,988 to P. A. Kourtzman; 1,484,125 to G. B. Frazer; 1,910,191 to J. R. M. Tisdale; 2,976,102 to B. F. Palmer; 3,706,097 to A. Bauer; 3,132,916 to F. Muller; and 3,855,599 to N. Helmschrott et al. Moreover, course and log recorders for recording the direction as well as distance, time and speed over long term intervals are often employed on vessels in aircraft, such as, disclosed in U.S. Pat. Nos. 886,788 to T. M. Foote; 1,701,582 to G. Mengden; 2,906,581 to T. P. Huden; 2,916,202 to A. W. Beishline; 2,959,459 to J. J. Ryan; and U.S. Pat. No. 3,075,192 to J. J. Ryan et al. Other systems are capable of detecting abrupt turning, braking and stops, as suggested in U.S. Pat. Nos. 2,487,819 to M. D. Markley et al; 3,099,817 to H. C. Kendall; 3,160,463 to F. Moscarini; 3,792,445 to R. M. Bucks et al; 3,206,116 to J. Short; 3,983,565 to E. Koller; 3,067,061 to J. E. Juhasz; 4,188,618 to E. S. Weisbart; 3,213,459 to F. R. Bramsch et al; 4,184,166 to H. H. Olson; 4,212,016 to H. Ruhl; and 3,383,696 and 3,624,660 to M. Fichter. Nonetheless, none of the systems referred to are capable of monitoring or sensing a broad range of performance characteristics of a vehicle so as to closely correlate or coordinate such data into a dense, high resolution recording over a limited time interval. In this respect, it is important that provision be made for automatic erasure of the information recorded at predetermined time intervals so that a specific time interval preceding and during an accident can be readily accessed and examined in determining the cause of an accident. Specifically, it should be possible to be able to determine actual ground speed, acceleration, deceleration or G forces, braking, steering, use of turn signals and headlights all in a closely coordinated sequence of events or readings over a limited time interval so as to be able to determine accurately the total performance and operating characteristics of a vehicle in relation to a specific time period. Special purpose devices have been suggested for use as a part of a recording system for the purpose of erasure of information, such as, that recorded on magnetic tape. In general, however, such devices have been intended more for use in erasing after extended time intervals, such as, at the end of a trip.

As previously mentioned, specifically in connection with accident analysis, it is highly desirable to record a number of diverse conditions or parameters representing the performance characteristics of a vehicle within a limited recording area and over a limited time interval so as to be able to record such conditions in real time and to permit automatic erasure at selected time intervals whereby only that time interval immediately preceding, during and after the course of an accident will be recorded and remain available for evaluation.

SUMMARY OF THE INVENTION

It is therefore an object of the present invention to provide for a novel and improved method and means for recording the performance characteristics of a vehicle.

It is another object of the present invention to provide for a novel and improved costeffective means for measuring and recording diverse operational or performance characteristics of a vehicle including but not limited to speed, acceleration or deceleration, braking, steering, turn signals and lighting which is extremely accurate and reliable in use but which is simple to install and can be retrofit into existing vehicles with a self-contained recording system which is capable of recording same over predetermined time intervals.

A further object of the present invention is to provide for recording and periodic automatic erasure of information representing performance characteristics of the vehicle in such a way as to enable precise identification of data recorded as a function of time and which is specifically adaptable for use in accident analysis.

Another object of the present invention is to provide for a novel and improved self-contained recording system which will permit repetitive high resolution recording of different performance characteristics of a vehicle in such a way that such information recorded is readily accessible for evaluation; and further wherein the system of the present invention greatly reduces the amount of information required to be stored while preserving adequate data for resolution of vital performance parameters or characteristics as a function of time.

In accordance with the present invention, there has been devised a novel and improved method and apparatus for sensing and recording diverse operational and performance characteristics of a vehicle which is broadly comprised of transducer means directly associated with different mechanical functions of the vehicle for sensing the operating characteristics of same in relation to time and for generating analog signals representative of certain of said functions and to combine same with digital signals representing other functions; signal converter means encodes the signals from said transducer means, converts same in predetermined order into a succession of digital data signals, and means are provided to temporarily store each succession of data signals generated. Recorder means then records the information stored serially as discrete blocks of data over a predetermined time interval in such a way as to enable ready access to and identification of each event or condition. Upon recording information over a selected time interval, the recording is automatically erased as additional information is transmitted to the recorder so as to provide a current history at intervals on the order of 30 minutes at all times.

A further important feature resides in the ability to record each data block at timed, discrete intervals together with synchronization or data signals so that the information when played back is readily identifiable and can be closely correlated both with respect to time and to starting and stopping of the vehicle. In the preferred form, recording of the information is initiated by turning on the ignition switch and writing of a series of data blocks onto a magnetic tape which is in the form of a closed loop of predetermined length. In this way, after a predetermined series of blocks have been written onto the tape so as to fill up the entire loop, the next series of data blocks will be written over the first series as the first series of blocks is automatically erased.

The system remains activated to continue the generation and recording of information after the ignition is turned off so that, for example, in the event of an accident, continuing data will be recorded on the tape to provide continuing information on vehicle performance for a limited time period after turning off the ignition to record events subsequent to turning off the engine.

The above and other objects, advantages and features of the present invention will become more readily understood and appreciated from a consideration of the following detailed description of a preferred embodiment when taken together with the accompanying drawings in which:

BRIEF DESCRIPTION OF THE DRAWINGS

FIG. 1 is an overall schematic view of the control circuit of the detection and recording apparatus of the present invention;

FIG. 2 is timing diagram illustrating the recording technique employed in the detection and recording apparatus of the present invention;

FIG. 3 is a somewhat schematic plan view of the transducer apparatus of the present invention shown installed in an automotive vehicle;

FIG. 4 is a side view of the steering mechanism of an automotive vehicle illustrating its cooperative disposition in relation to the transducer apparatus of the present invention;

FIG. 5 is a top view illustrating mounting of the transducer apparatus in cooperative disposition with the braking mechanism of an automotive vehicle;

FIG. 6 is a detailed fragmentary view of the speed indicating portion of an automotive vehicle in relation to the transducer apparatus of the present invention; and FIG. 7 is a sectional view of the accelerometer transducer apparatus in accordance with the present invention.

DETAILED DESCRIPTION OF THE PREFERRED EMBODIMENT

Referring in detail to the drawings, in the circuitry shown in FIG. 1, a standard 12-volt power source is illustrated at 10 which applies voltage to power converter circuit 12, the latter converting the voltage to a regulated signal, such as, 5 volts for operation of the control circuitry hereinafter described. The negative side of the battery or power source 10 is connected to microcontroller 14 for return to ground. Microcontroller 14 orders in the information from the 8-channel multiplexer and 8 bit analog-to-digital converter circuit 16 into a memory device 18. A series of transducers are provided to sense and measure various performance characteristics of the vehicle and, for the purpose of illustration but not limitation, may include a brake transducer circuit 22, speed transducer circuit 24, steering transducer 26, acceleration transducer 28 and turn signal transducer 30. These are installed in the vehicle in a manner to be described so as to be responsive to the performance of various parts of the vehicle and to deliver output signals into an analog signal conditioner circuit 32.

It should be noted that a standard ignition switch 34 controls the making or breaking of a power relay 36 so that when the ignition switch 34 is turned on, it will activate the control circuit as described for as long as the ignition switch 34 is energized. However, when the ignition is turned off, the power relay 36 will continue to keep the circuit closed for a predetermined time interval so that the control circuit will continue to measure performance of the various parts described. This will assure that power will continue to be delivered to run the system in order to complete whatever data block is being read at that moment and over a predetermined but limited time interval thereafter.

The analog signal conditioner circuit 32 is intended to scale the analog signals received from the transducers and convert to an analog voltage which can be applied ove,r output lines 31 into the multiplexer and analog to digital converter circuit 16. The microcontroller 14 will send out an address to the converter circuit 16 which causes the multiplexer portion of the circuit 16 to select each channel in succession from the circuit 32 so as to order in the signals from the conditioner circuit 32 and permit their conversion into digital signals or other suitable coded data representing the analog signals received from the conditioner circuit. These signals are delivered over line 54 to the microcontroller circuit 14 which in turn applies them in serial fashion to the memory 18.

The timing chart shown in FIG. 2 illustrates the recording technique employed to permit accurate and dense but high resolution recording of the digital signals ordered out of the converter circuit 16 into the memory device 18. Data will be transferred from memory device 18 to the recorder under the control of the microcontroller 14 so that a specific dwell period or interval is created for each data point or series of pulses written on the tape from the series of performance transducers as a function of time. Referring to the timing diagram of FIG. 2, line 40 represents the "ignition on" period while the line 41 represents "power on", 41' designating the point at which the power relay is enabled while the drop in power 40' represents the point at which the ignition switch is disabled. Lines 42 and 43, respectively, represent the timing intervals for each data point to be read from the performance transducers and, for the purpose of illustration, each interval may be at 0.2 second intervals. Line 44 represents by that portion of each time interval when the signal goes high as at 45 and 46 the point in time in which data is read from the performance transducers into the memory device. Preferably, the logic and timing of the microcontroller are such that two data points in succession are stored in the memory 18 before they are transferred during the second interval 43 to the recorder so that an interrecord gap 48 is followed by recording of two blocks of data, as at 49. In this manner, the microcontroller 14 is capable of sending leader information or synchronizing data to the tape and will store the first data block, then after reading the second data block will over the next 0.2 second interval send both of the data blocks out so that they are written on tape with the beginning of each data block pair 49, preceded by an interrecord gap 48. Accordingly, when the information is played back, the beginning of each data block is readily discernible and permits accurate sensing of each series of pulses or blocks in succession which have been recorded on tape. For instance, the memory device may be a 2114 RAM while the microcontroller or programmer may consist of a crystal oscillator, a 6502 MPU connected to timers T1 6522 and T2 6522 and an ROM program chip. The microcontroller contains a series of three address lines 52 to the analog-to-digital converter 16 and a start line 53. The analog-to-digital converter may be a combination consisting of an AD809 integrated circuit which makes up the MUX and analog-to-digital converter. A series of data bit lines 54 are directed to the microcontroller. The AD809 is an 8-channel multiplexer with an analog-to-digital converter which will apply the 4 bits of information from the converter over the output lines 54 to the microcontroller. Thus, each data block or word is divided into 4 bits from each of the 5 transducers 22, 24, 26, 28 and 30. However, it will be evident that other performance characteristics of the vehicle may be measured, such as, headlights, oil pressure, generator, etc. In that case, the data bits would be directed over additional data lines into the control circuit as described.

Preferably, a closed loop tape system is employed as the recorder 20 which will permit recording in the manner described over a selected time interval, such as, on the order of twenty minutes. A typical recorder system is the GE cassette recorder No. 3-5105A. The microcontroller 14 simultaneously orders into the memory device 18 a succession of record numbers which will start from zero each time that the ignition is turned on and will progressively count up for each data block recorded. These numbers are simultaneously recorded with the transducer data onto the tape to indicate the location of the first data point recorded after the car is started and the last data point when the ignition is turned off. Other identification words or characters may be employed to detect tape gaps or to mark the first record after each tape gap. In this way, the recording system affords a clear, unambiguous indication of when the car is started and when it is turned off.

FIGS. 3 to 7 illustrate installation of the transducer means 22, 24 and 26, 28 and 30 in a vehicle represented at V and their cooperative disposition and relationship to different component elements of the automobile.

Thus, FIG. 5 illustrates the mounting of the transducer 22 with respect to a brake pedal 60 and associated arm 62 which is pivoted about a stub shaft 63. The transducer 22 is a potentiometer which will sense the rate of travel of the pedal when it is depressed and will generate a voltage signal which is transmitted to the analog conditioner circuit 32 as described so that the signal generated will reflect both the rate and distance of travel of the pedal when depressed.

As shown in FIG. 4, the steering transducer 24 is a potentiometer which includes a wire lead 65 extending over a spring secured to the chassis with the other end of the wire passing into the steering mechanism as represented at 66 at the lower end of the steering column 67 so that, as the steering wheel 68 is rotated, its rate and distance of turning will be sensed by the potentiometer 24 and converted into an analog signal delivered to the conditioner circuit. In this regard, it is possible to avoid making a direct linear translation from the data coming into the associate signal transducer 32 and the data coming out; for example, where the steering wheel may turn two revolutions in either direction, it is desirable to measure the first 20°-30° from dead center quite accurately and thereafter reduce the sensitivity to extreme turning. This is customarily referred to as companding and would progress from an accurate measurement of extremely small angles to the rough measurement of larger angles.

In determining speed, from a consideration of FIG. 6, a magnetic pickup 70 is shown mounted in a transmission case 72 to sense the movement of a target wheel 73 therein, the target wheel being composed at least in part of a ferrous metal. As schematically shown in FIG. 1, the wheel is a magnetic element 73 which operates in conjunction with a Hall effect switch 71 used in place of magnetic pickup 70 so that as the wheel spins, the switch 71 will determine its polarity and generate a pulse which can be applied to the analog conditioner 32 through a one shot 74 and filter 75 for frequency to voltage conversion.

The accelerometer transducer 28 is illustrated in FIG. 7 and may be conveniently positioned at any desired location in the vehicle but preferably is located in the central controller which is mounted on the chassis or frame of the vehicle to respond to changes in velocity, i.e., acceleration or deceleration both along axes parallel and perpendicular to the direction of travel. For instance, the transducer may be a Model A732, manufactured and sold by Engineering Dynamics of Englewood, Colo. and contains a detector means 78 which senses inertial displacement, and the controller 14 develops a feedback control current to electromagnets 80 so as to reestablish the neutral position while generating a voltage representing the magnitude of the correction signal required. Thus, the transducer 28 will deliver signals representing forward or reverse acceleration, for example, over line 82 while acceleration in the transverse direction and applied over line 84 would indicate acceleration either in a direction to the left or right of the direction of travel.

With respect to the turn signal transducer 30, digital signals may be delivered directly to the microcontroller to represent the direction of turning. Since a digital signal may be generated directly by the transducer 30, this may be applied over the lines 31' and 31" directly to the microcontroller.

In practice, when the ignition switch is turned on and the car is placed in operation, the following sequence of steps occur:

(1) The power relay 36 is enabled by closing of the ignition switch and memory 18 is cleared. The tape drive 20 is activated, a synchronizing data signal is applied, and the timers $T_1$ and $T_2$ in the microcontroller are activated to time the recording of signals. (2) The timer $T_1$ will then control the timing of data blocks entered by the transducers through the conditioner circuit 32, converter 16 into storage 18. A channel address is sent to initialize the converter, wait for conversion, then a channel is read. (3) The channel address is incremented by the microcontroller. (4) The data block is recorded with a synchronizing data signal. (5) The preceding information is directed to the microcontroller which also addresses the circuit to determine whether ignition has been turned off and power relay disabled. If the ignition is off, a code is then recorded in the memory 18 to generate a distinct data signal which is recorded with the last data block to represent that the ignition was turned off at that point in time.

As noted earlier, the power relay 36 is disabled a predetermined time interval after the ignition switch is turned off so that the recorder will continue to record data blocks directed from the memory device 18. The period of time selected for continued recording may vary but generally may be on the order of thirty seconds to one minute. In this way, if an accident should occur, even though the ignition switch may be turned off by the operator, the recorder will continue to record the performance characteristics of the vehicle to indicate whether it is still in motion, any impact which would result in sudden acceleration or deceleration, steering as well as speed changes, etc. If an accident should occur, the tape cassette can be removed and played back to determine the various parameters of vehicle performance prior to, during and after an accident so as to provide an accurate analysis for investigational purposes.

From the foregoing, it will be appreciated that a novel and improved, greatly simplified and inexpensive self-contained vehicle performance system has been devised in which the signals generated by the transducer means afford an accurate measurement of vehicle operational and performance parameters including but not limited to time, speed, braking, steering, acceleration, deceleration, and G force impact and direction. Preferably these signals are converted into data or information blocks which are stored until they are addressed by the microcontroller to systematically order out the data blocks for recording onto the tape drive. The microcontroller incorporates the necessary timing circuitry to regulate the rate of recording and inter-record gaps between recordings together with synchronizing data signals so that when the information is played back an accurate time frame or reference is provided to be able to correlate the signals with respect to the time period preceding and during an accident. In most instances, information that has been sensed, stored and reproduced will be used to establish facts relating to causation and liability of an accident involving a motor vehicle. It will be further evident that while the preferred form of invention has been set forth and described specifically in conjunction with accident analysis, it is readily conformable for use in sensing vehicle performance under driving conditions for various purposes other than accident analysis. In this relation, a disabling switch may be provided for the vehicle operator to permit selective control over the time period to be recorded on the tape cassette. Thus, if the operator should desire to provide a sample of vehicle performance under special road or driving conditions, he may select a time interval on the order of twenty to thirty minutes for recording and following which the tape drive would be deactivated without disturbing the rest of the circuitry or system. The record would then be preserved of the selected time interval. It will be apparent here that deactivation of the tape drive may be done simply by removal of the tape cassette by the vehicle operator if it is desired to operate the system for this purpose. Otherwise, for the specific purpose of accident analysis, it is important that the tape cassette not be accessible to or controllable by the operator so that nothing can be done to interfere with accurate recording of the time interval during which the accident occurs.

When used in an automobile, in addition to accident analysis, the system may be used as evidence in traffic violation litigation. The system has a direct application to a wide variety of industrial uses; specifically when it is required to monitor mechanical or physical conditions and events in sequence. It may be impractical and unnecessary to sense, record and retain a record of conditions and events over long periods of time when only the last few moments are meaningful. Some examples are (1) a desire to know the exact sequence of failure of components in a mechanical device; (2) a need to know the stress, wind conditions and temperature affecting the struts on a bridge for an entire forty-eight hour period prior to collapse of the bridge; and (3) a need to know how a machine was operated by an employee fifteen seconds prior to the occurrence of an industrial accident.

It is therefore to be understood that various modifications and changes may be made in the method and apparatus of the present invention as well as its intended application and use without departing from the spirit and scope of the present invention as defined by the appended claims.

We claim:

1. In a self-contained vehicle performance recorder system wherein a plurality of transducer means are operative to produce a succession of signals as a function of time representative of vehicle performance parameters including speed, braking rate, steering rate and acceleration of the vehicle under operating conditions, the improvement comprising:

control circuit means including conditioning means for converting said succession of signals into a series of data blocks, each block containing a signal representative of each parameter measured;

programmer means for generating a succession of record numbers and for addressing said control circuit means to order out each said series of data blocks received from said transducer means and correlating said record numbers therewith;

means for temporarily storing each said record number in correlated relation with each said series of data blocks in succession ordered out of said control circuit means; and recorder means for writing each said series of data blocks stored onto a record medium over a predetermined time period, said programmer means including means to generate a write command signal to activate said recorder means for writing each said series of data blocks at spaced time intervals within said time period, means to generate a reference timing signal for recording on said recording medium in correlated relation to each said record number and each said series of data blocks recorded, and means for erasing said series of record numbers and corresponding data blocks recorded over said predetermined time period, and said recorder means operative to write each next succession of record numbers and corresponding data blocks received from said transducer means over a next predetermined time period corresponding to said first predetermined time period.

2. In a self-contained vehicle performance recorder system according to claim 1, said programmer means operative to activate said recorder means for writing each said data block at spaced time intervals within said predetermined time period.

3. In a self-contained vehicle performance recorder system according to claim 1, said programmer means operative to transmit a first reference timing signal to said recorder means representative of turning said ignition switch on and for transmitting a second reference timing signal to said recorder system for deactivation of said recorder system after said ignition switch has been turned off.

4. In a self-contained vehicle performance recorder system according to claim 1, said recorder means including a closed loop recording medium operative to record a series of data blocks over a first predetermined time period followed by erasing said series of data blocks recorded over said first predetermined time period as the next succession of data blocks are recorded over each next predetermined time period in succession.

5. In a self-contained vehicle performance recorder system according to claim 1, said programmer means operative to transmit two data blocks from said storing means within each discrete time interval between said timing signals, said recorder means operative to write each data block beginning at each discrete time interval between said timing signals.

6. In a self-contained vehicle performance recorder system according to claim 5, said programmer means operative to address said storing means after two successive data blocks have been stored and to transmit said two successive data blocks stored as one transmission over a discrete time interval.

7. In a self-contained vehicle performance recorder system according to claim 1, said transducer means operative to produce a succession of analog signals as a function of time and said control circuit means including analog-to-digital converter means for converting each succession of analog signals received from said transducer means into a series of data blocks, each data block containing a signal from each parameter measured.

8. In a self-contained vehicle performance recorder system according to claim 7, said transducer meand including steady state transducer means for transmitting digital data directly to said programmer means representative of the steady state conditions of vehicle performance parameters selected from the group consisting of turn signals, headlights, ignition switch, and said programmer means operative to combine said pulses from said steady state transducer means with the digital data comprising each said data block received from said control circuit means for storage and writing onto said recording means.

9. In a self-contained recorder system adapted for installation on a vehicle wherein a plurality of transducer means are operative to produce a succession of analog signals representative of speed, braking rate, steering rate and acceleration, the combination therewith comprising:
  control circuit means including analog-to-digital converter means for converting said succession of analog signals into a series of digital data;
  programmer means for generating a succession of record numbers and for addressing said converter means to order out each said series of digital data produced by said control circuit means and correlating said record numbers therewith;
  means for storing each said record number in correlated relation with each said series of digital data ordered out of said control circuit means by said programmer means as a block of information; and
  recorder means for writing each of said block of information stored over a discrete time interval onto a record medium, said programmer means including means to generate a write command signal to address said storing means for writing each block of information at spaced time intervals greater than the time interval required for said recorder means to write each block of information stored.

10. In a recorder system according to claim 9, said programming means operative to apply synchronizing data signals to said recorder means at limited discrete time intervals for recording on said recording medium, said write command signals being correlated in time with said synchronizing data signals to cause each block of information to be written on said tape in correlated relation to a synchronizing data signal.

11. In a recorder system according to claim 10, further characterized in that each said write command signal is operative to transmit two blocks of information from said storage means within alternate discrete time intervals and said recorder means is operative to write each block of information at the beginning of each said alternate discrete time interval between said synchronizing data signals.

12. In a recorder system according to claim 9, including transducer means for transmitting digital data directly to said programmer means representative of the steady state condition of selected control switches in said vehicle.

13. In a recorder system according to claim 9, including a holding relay operative to activate said recorder system and respond to turning on the vehicle ignition system and for maintaining said recorder system in an activated state a predetermined time interval after said ignition switch has been turned off.

14. In a recorder system according to claim 13, said programmer means operative to transmit a write command signal to said recorder means representative of turning said ignition switch on and for transmitting a separate identifying signal to said recorder system representative of deactivation of said recorder system after said ignition switch has been turned off.

15. In a recorder system according to claim 9, said recorder means including a closed loop recording medium and said recorder means operative to write successive blocks of information serially for a predetermined time period.

* * * * *

UNITED STATES PATENT AND TRADEMARK OFFICE
CERTIFICATE OF CORRECTION

PATENT NO. : 4,533,962
DATED : 6 August, 1985
INVENTOR(S) : Decker, Ronald R.; Shannon, William T.

It is certified that error appears in the above—identified patent and that said Letters Patent is hereby corrected as shown below:

Column 2, line 39, cancel "costeffective" and substitute -- cost-effective --.

Column 3, line 21, cancel "or" and substitute -- of --.

Column 4, line 44, cancel "ove,r" and substitute -- over --.

Column 9, line 60, (claim 8), cancel "meand" and substitute -- means --.

Column 10, line 21, (claim 9), cancel "of" (first occurrence).

Signed and Sealed this

Eleventh Day of February 1986

[SEAL]

Attest:

DONALD J. QUIGG

Attesting Officer

Commissioner of Patents and Trademarks